United States Patent Office 3,070,631
Patented Dec. 25, 1962

3,070,631
PROCESS FOR THE PREPARATION OF ALKYLBORINES
Donald M. Coyne, Prairie Village, Kans., assignor to Continental Oil Company, Ponca City, Okla., a corporation of Delaware
No Drawing. Filed Aug. 31, 1959, Ser. No. 836,886
2 Claims. (Cl. 260—606.5)

This invention relates to a simplified process for the preparation of alkylborines from relatively inexpensive raw materials. More particularly, this invention relates to a process for the preparation of alkylborines, which process does not require diborane as the raw material.

Alkylborines are much desired compositions which are useful as high energy fuels. Prior art processes for the manufacture of such compounds have involved the use of aluminum alkyls, dialkyl aluminum hydrides, dialkyl aluminum halides or diborane as the raw material. The boiling points of the aluminum alkyls are often near to those of the desired alkylborines, and are difficult to remove from the final product. The alkyl-substituted aluminum halides and hydrides are not very soluble in common hydrocarbon solvents, so that it is sometimes difficult to obtain homogeneous reaction conditions, using ordinary inexpensive solvent diluents.

Diborane has become a strategic raw material and is quite expensive. It is obviously desirable to base the manufacture of alkylborines on raw materials which are more economical and which facilitate the carrying out of the manufacturing steps with a minimum of processing expense.

It is a primary object of the present invention to provide a simple and economical method for the preparation of alkylborines. Another object of this invention is to provide a method of manufacturing alkylborines which does not require the use of such materials as aluminum alkyls, dialkyl aluminum hydrides, or dialkyl aluminum halides as the raw material. It is a further object of my invention to provide a process for the manufacture of alkylborines wherein the alkylborine produced may be easily separated from the other components of the reaction. Other objects and advantages of the invention will appear as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a process for the preparation of an alkylborine compound which comprises reacting an alkylaluminum alkoxide at an elevated temperature with a boron compound which may be either a borate ester or a boron halide. Following the reaction of the various reactants, the alkylborine formed may be easily recovered from the other components by distillation.

The principal reaction involved in the process may be represented by the following equation:

$$R_nAl(OR')_{3-n} + n/3 BX_3 \longrightarrow n/3 BR_3 + X_nAl(OR')_{3-n}$$

wherein R and R' represent alkyl radicals, X represents an alkoxy or a halide radical, and $n$ is a number which may be either 1 or 2.

Before proceeding with specific examples illustrating my invention, it may be well to indicate in general the nature of the materials required in the process.

Suitable alkylaluminum alkoxides which may be used include those tabulated below.

| Compound | Boiling Point | | M.P., °C. |
|---|---|---|---|
| | Pressure, mm. Hg | °C. | |
| $CH_3OAl(CH_3)_2$ | 50 | 119-122 | 30-33 |
| $CH_3OAl(C_2H_5)_2$ | 10 | 87-88 | |
| | 20 | 97 | |
| | 10 | 110 | |
| $C_2H_5OAl(C_2H_5)_2$ | 5 | 61 | |
| | 20 | 122 | |
| | 10 | 103-107 | 2.5-4.5 |
| $nC_4H_9OAl(C_2H_5)_2$ | 5 | 93 | |
| | 20 | 161 | |
| | 5 | 125-126 | |
| $CH_3CH_2CH_2CH_2C(CH_3)_2OAl(C_2H_5)_2$ | 0.15-0.20 | 90-98 | |
| $nC_8H_{17}OAl(C_2H_5)_2$ | 7 | 190-192 | |
| $C_6H_5OAl(C_2H_5)_2$ | 5 | 140-173 | |
| $HOAl(C_2H_5)_2$ | $10^{-3}$ | 120 | |
| $C_2H_5OAl(nC_3H_7)_2$ | 4-5 | 118-120 | |
| $CH_3OAl[CH_2CH(C_2H_5)(CH_2)_3]_2$ | 0.5 | 95 | |
| | $10^{-2}$-$10^{-3}$ | 180 | |
|  | | | 98 |
| $CH_3CO_2Al(C_2H_5)_2$ | $5 \times 10^{-4}$ | 73-74 | 30 |
| $C_6H_5CO_2Al(C_2H_5)_2$ | $10^{-3}$ | 130-135 | |
| $C_6H_5CO_2Al(iC_4H_9)_2$ | | | 58 |
| $(C_2H_5O)_2AlC_2H_5$ | 0.1 | 137 | |
| $(HO)_2AlC_2H_5$ | 4 | 158-160 | 35-37 |

I prefer dialkylaluminum alkoxides, primarily for reasons of economy and efficiency. The alkylaluminum alkoxides are sufficiently soluble in such solvents as xylene, so that homogeneous reaction conditions can be maintained in the presence of a diluent. However, if desired, an excess of alkylaluminum alkoxide itself may be used as a solvent, and the product recovered easily by distillation, by virtue of the widely differing boiling points of the reactants and product.

Suitable borate esters include trialkyl borates such as those listed below.

| Borate | Boiling point | | M.P., °C. |
|---|---|---|---|
| | Pressure, mm. Hg | °C. | |
| $(CH_3-O)_3B$ | | 68.7 | -29.2 |
| $(C_2H_5-O)_3B$ | | 117.3 | -84.8 |
| $(n-C_3H_7-O)_3B$ | | 177 | |
| $(i-C_3H_7-O)_3B$ | | 140 | |
| $(n-C_4H_9-O)_3B$ | 15 | 115 | |
| $(i-C_4H_9-O)_3B$ | | 212 | |
| $(s-C_4H_9-O)_3B$ | | 194 | |
| $(t-C_4H_9-O)_3B$ | 10 | 55 | 12 |
| $(n-C_5H_{11}-O)_3B$ | 16 | 147 | |
| $(i-C_5H_{11}-O)_3B$ | 12 | 132 | |
| $(t-C_5H_{11}-O)_3B$ | 8 | 92 | |
| $(C_3H_7CH(CH_3)-O)_3B$ | 12 | 110 | |
| $((C_2H_5)_2CH-O)_3B$ | 8 | 105 | |
| $(s-C_4H_9CH_2-O)_3B$ | | 260 | |
| $(i-C_3H_7CH(CH_3)-O)_3B$ | 0.4 | 59-61 | |
| $(Cyclohexyl-O)_3B$ | 17 | 203 | 54 |
| $(n-Hexyl-O)_3B$ | | 183 | |
| $(n-C_3H_7(CH_3)_2C-O)_3B$ | 1 | 74-95 | |
| $(t-C_4H_9CH(CH_3-O)_3B$ | 9 | 122 | |
| $(N-C_5H_{11}CH(CH_3)-O)_3B$ | 5 | 128 | |
| $(i-C_6H_{13}-O)_3B$ | 5 | 140 | |
| $(i-C_4H_9CH(CH_3)-O)_3B$ | 10 | 120 | |
| $(s-C_4H_9CH_2-O)_3B$ | 15 | 169 | |
| $(n-C_7H_{15}-O)_3B$ | 2 | 185 | |
| $(n-C_3H_7CH(i-C_3H_7)-O)_3B$ | | 288 | |
| $(n-C_8H_{17}-O)_3B$ | 0.4 | 174 | |
| $(n-C_6H_{13}CH(CH_2)-O)_3B$ | 0.5 | 148 | |
| $(n-C_{10}H_{21}-O)_3B$ | 0.15 | 275 | |
| $(n-C_{12}H_{25}-O)_3B$ | 23 | 185 | |

In general, I prefer to use the lower molecular weight trialkyl borates because of lower cost and also to facilitate more efficient product recovery and maintenance of homogeneous reaction conditions.

Suitable boron halides include boron fluoride, chloride, and bromide. Because it is more readily obtained in quantity at an economical price, I prefer to use boron fluoride.

Suitable temperatures may vary from about 100° C. to about 300° C.; however, generally I prefer to operate within a temperature range of about 200 to 250° C. As a rule, I prefer to carry out the reaction initially just below the boiling point of the alkylborine being produced. Toward the end of the reaction, the temperature is raised so that the alkylborine is distilled from the reaction vessel. If desired, the reaction may be carried out under superatmospheric pressures. It should be understood, however, that higher or lower temperatures may be used in the process with a resultant increase or decrease in the reaction rate in accordance with the general law of chemical reactions.

In order that those skilled in the art may better understand how the present invention may be carried into effect, the following examples are given by way of illustration and not by way of limitation. All yields are based on the boron ester or the boron halide compound consumed unless otherwise indicated.

*Example 1*

Diethylaluminum 2,2-dimethylpentoxide (0.5 mole) was placed in a one-liter, three-necked flask fitted with a stirrer, heating mantle, and distilling head. Triisobutyl borate (0.33 mole) was added dropwise at 150° C. Little reaction appeared to take place; so the temperature was increased to 210° C.–250° C. during the remainder of the addition and for an additional hour. Triethylborine distilled over during this time. The mixture was cooled and xylene added. The mixture was heated to boiling, and more triethylborine distilled over. The crude triethylborine weighed 37 g. and contained some xylene. Redistillation gave 25.5 g. of triethylborine. It was spontaneously inflammable in air and was found to be identical with an authentic sample of triethylborine on analysis by vapor phase chromatography.

*Example 2*

There was placed in a reactor equipped with a reflux condenser and distillation outlet approximately 50 parts by weight of a 50 percent solution of diethylaluminum butoxide in xylene. There was then added 28.9 parts by weight of tri-n-butyl borate over a period of one-half hour. The xylene and approximately 5.6 parts by weight of triethylborine were then removed by distillation at 150° C. The temperature was then raised from 150° to 210° C. with recovery of 4.7 additional parts by weight of triethylborine. The yield was 81 percent based on n-butyl borate.

*Example 3*

In a reactor equipped with a stirrer, reflux condenser, and a distillation outlet, there was placed 237 parts by weight of diethylaluminum n-butoxide. The alkoxide was heated to 120° C., and there was slowly added 138 parts by weight of the ether complex of boron fluoride in a 47 percent solution in diethyl ether. A mixture of triethylborine and ether was obtained as distillate during the addition. Analysis showed this distillate contained ether and triethylborine in such proportions that approximately 24.1 parts by weight of triethylborine was produced. This corresponds to a net yield per pass of about 25 percent, based on boron fluoride, obtained with a very short reaction time, such as might be employed in a continuous process.

Boron chloride and bromide may also be employed in the present process. However, the commercial processes for manufacture of these boron halides are uneconomical so that they are considerably more expensive than boron fluoride and cannot at this time be regarded as economically suitable raw materials.

It is obvious that many variations may be made in the products and processes of this invention without departing from the spirit and scope thereof as defined in the appended claims.

I claim:
1. A method of manufacturing a trialkylborine which comprises reacting an alkylaluminum alkoxide with boron fluoride at a temperature within the range of about 100° to 300° C. and recovering said trialkylborine by distillation.
2. A method of manufacturing triethylborine which comprises heating a diethylaluminum alkoxide to 120° C., reacting a boron fluoride-ether complex with said heated diethylaluminum alkoxide and simultaneously recovering triethylborine product as a distillate.

References Cited in the file of this patent

FOREIGN PATENTS 812,787   Great Britain _____ Apr. 29, 1959

OTHER REFERENCES

Jenker: German application 1,028,120, printed April 17, 1958 (Kl. 12$_o$ 26/03), 2 pages spec., 260/606.5.
Koster: Ann. Chem., vol. 618, pp. 31 to 43 (1958).